United States Patent
Poche

3,951,093
Apr. 20, 1976

[54] AMPHIBIOUS AIR TRACK VEHICLE

[76] Inventor: John M. Poche, 6317 Franklin Ave., New Orleans, La. 70122

[22] Filed: Oct. 4, 1974

[21] Appl. No.: 512,367

[52] U.S. Cl. .............................. 115/1 R; 114/67 A
[51] Int. Cl.² .......................................... B60F 3/00
[58] Field of Search ............. 115/1 R, 1 B; 180/116, 180/117, 119, 126; 114/67 R, 67 A

[56] References Cited
UNITED STATES PATENTS

| 2,546,523 | 3/1951 | Reynolds | 115/1 R |
| 2,710,777 | 6/1955 | Poche | 115/1 R |
| 3,189,115 | 6/1965 | Rethorst | 115/1 R |
| 3,207,245 | 9/1965 | Weiland | 114/67 A |
| 3,306,250 | 2/1967 | Pitchford | 115/1 R |
| 3,470,633 | 10/1969 | Soehnlen | 115/1 R |
| 3,559,611 | 2/1971 | Cushman | 115/1 R |
| 3,819,240 | 6/1974 | Bibaut | 115/1 R |

FOREIGN PATENTS OR APPLICATIONS

| 1,103,106 | 2/1968 | United Kingdom | 180/119 |

Primary Examiner—Trygve M. Blix
Assistant Examiner—Charles E. Frankfort
Attorney, Agent, or Firm—Morris Sussman

[57] ABSTRACT

This invention of an amphibious air track vehicle consists of five major assemblies. There are two equally spaced and parallel floatable elongated bodies each of which is encompassed by a belt having a plurality of extended space, parallel and laterally disposed floatable cleats; and drive sprockets which rotate the belts about the elongated bodies. Rotation apparatus for the belts is contained within each body; and a plurality of buoyant wheels each having low pressure tires thereon; and secondly wheels being mounted end to end on a single axis to form a floatable box-like wheel unit, there being two separate boxlike wheel units, one at each end of the vehicle and positioned laterally between each of the floatable elongated bodies; and lastly, a body structure that forms a top deck, rectangular in form, that extends over top of both the two floatable elongated bodies and their belts and the two box-like wheel units. The underside of the body structure is provided with a plurality of laterally extending, parallel and equally spaced vertically-disposed semiflexible curtain-like structures that divide the rectangular space on the under side of the body structure and between the floatable elongated bodies that are located with one body on and under each side of the body structure and between the box-like two wheel units that provide four rigid support outer walls for air lift chambers that are divided into a plurality of compartments each of which is supplied with a downward flow of air under pressure from a separate blower mounted on top of the body structure and back of the control cabin power plant and forward of the deck space.

6 Claims, 15 Drawing Figures

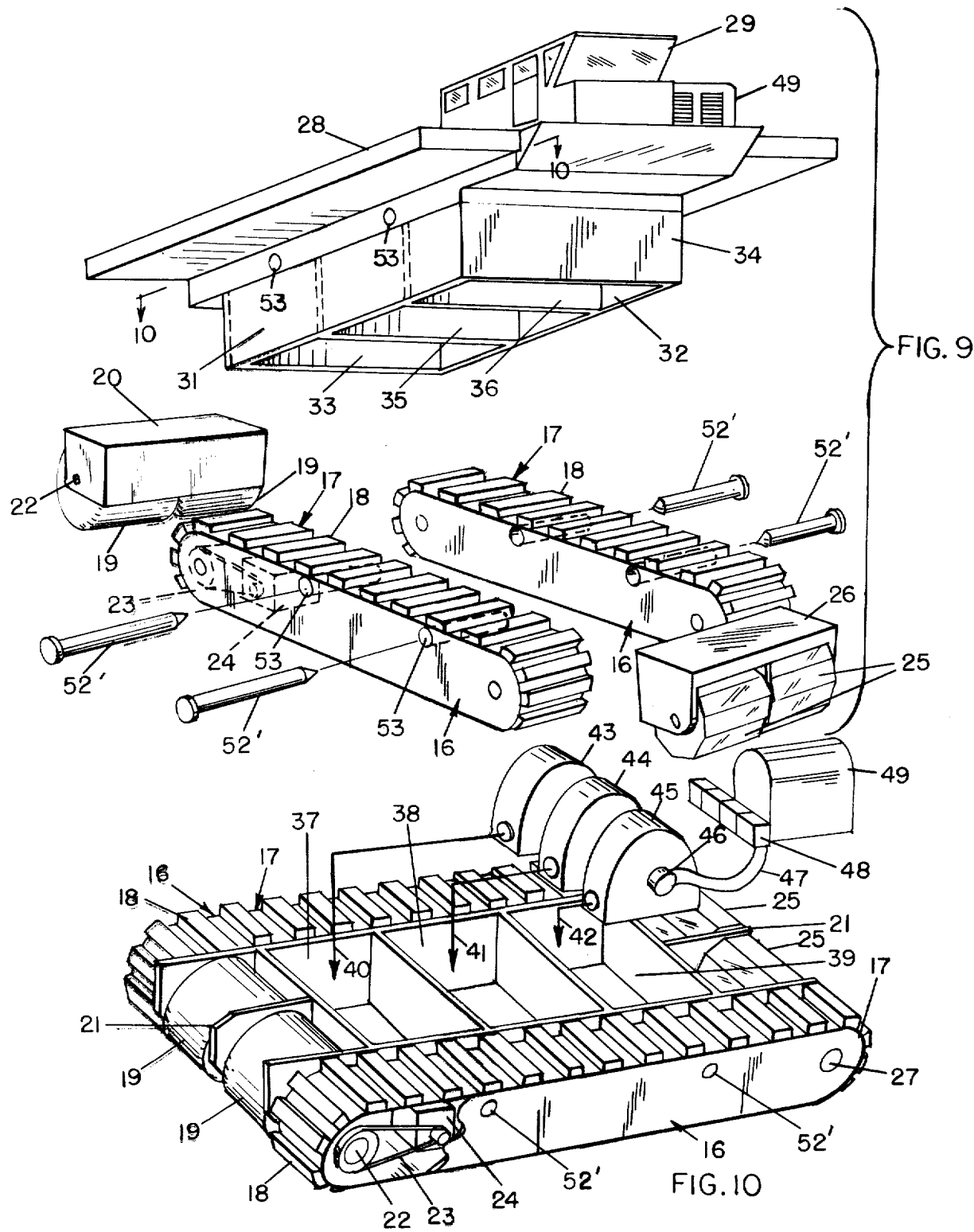

3,951,093

AMPHIBIOUS AIR TRACK VEHICLE

BRIEF SUMMARY OF THE INVENTION

This invention relates to vehicles; more particularly, to amphibious vehicles; still more particularly, to amphibious air cushion vehicles having air support.

This vehicle is adapted to travel on both land and water. This vehicle is not intended to lift off the ground; the vehicle works especially well as it has airlift traction structure. When merging into soft terrain, the airlift traction structure is designed to be activated, having a plurality of airlift chambers that supplies and confines air pressure to the surface of boggy terrain providing airlift to increase ground pressure area of the vehicle also relieving the vehicle of some of the weight.

While men have long strived to invent a perfect vehicle for use on land and water for military purpose, for transport of personnel and equipment, and for industrial use, it was not until the event of this present invention that this has ever been achieved, particularly in so far as the industrial use is concerned.

One of the greatest industrial needs for an amphibious vehicle is that for use on water and land in and over marsh lands in connection with oil exploration, land reclamation work, and for mosquito control work.

It is therefore the principal object of this invention to provide an amphibious air tract vehicle of the character herein described that will run over almost any kind of terrain no matter how rough it may be, or what its water content may be, performing well in deep water and on steep grades.

Another object of this invention is to provide an amphibious air track vehicle that does not depend on downward air lift pressure for its support, the air pressure merely being an accessory form of air lift for use on certain types of surfaces.

Another object of this invention is to provide an amphibious air track vehicle that is provided with, and powered with, four ground contact buoyant bodies, that are traction bodies, two of which are provided with floatable tracks, as will be described later on in this specification and its appended claims.

Another object of this invention is to provide an amphibious air track vehicle whose tracks not only provide additional traction on the terrain but also offer assistance in the buoyancy of the vehicle.

Another object of this invention is to provide an amphibious air track vehicle that embodies sectional construction having five self contained powered member bodies with telescope tubular axle housing, slip in axles and pins, that permit disassembling and assembling in a minimum of time and with a minimum of effort in order that the vehicle may be transported anywhere in the world in a minimum of space, weight and size, and each sectional unit being of such weight that the sectional members can be easily handled by motor freight, railroad, ocean freight, or even by helicopter to the out of the way places since units are designed to be handled by a minimum of equipment.

Still another, although by no means the final object of this invention, is to provide an amphibious air track vehicle that can be used without the need of expensive conversion.

Other and further objects and advantages of this novel and unique invention will no doubt become apparent as the reading of this specification and its appended claims continues and an examination of the accompanying drawings is made in connection therewith.

Brief description of the several views of the drawing. In the drawings:

FIG. 9 is a front right hand side pictorial exploded view of this invention.

FIG. 10 is a left hand rear pictorial exploded view of this invention showing its blowers in relation to the hereinafter described air lift compartments and with the body structure not shown for reasons of clarity.

Figure 1:
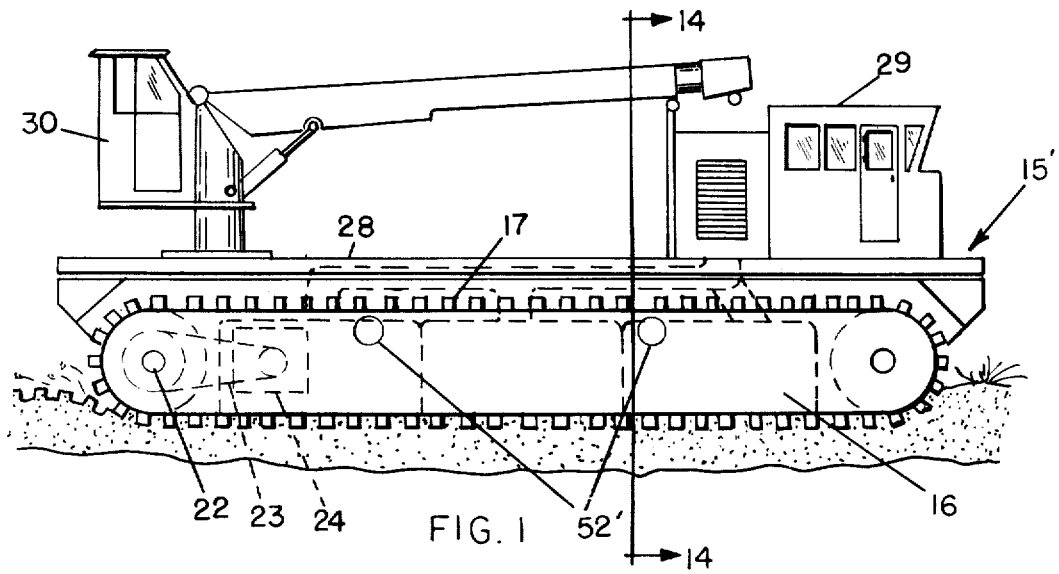
FIG. 1 is a side view of this invention in motion on the ground.
Figure 2:
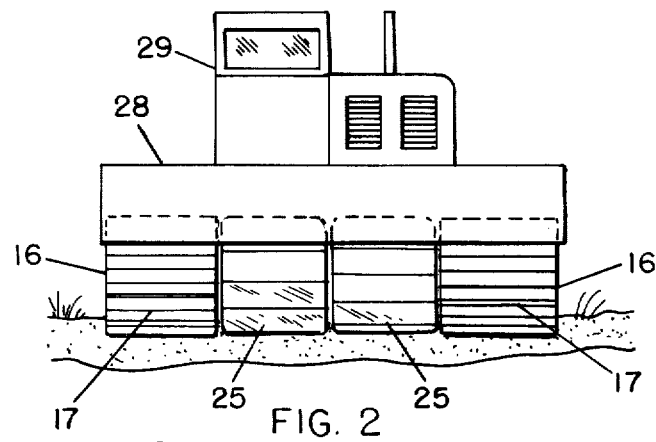
FIG. 2 is a front view of this invention, as shown in actual use, showing the rotating traction bodies the full width of the vehicle.
Figure 3:
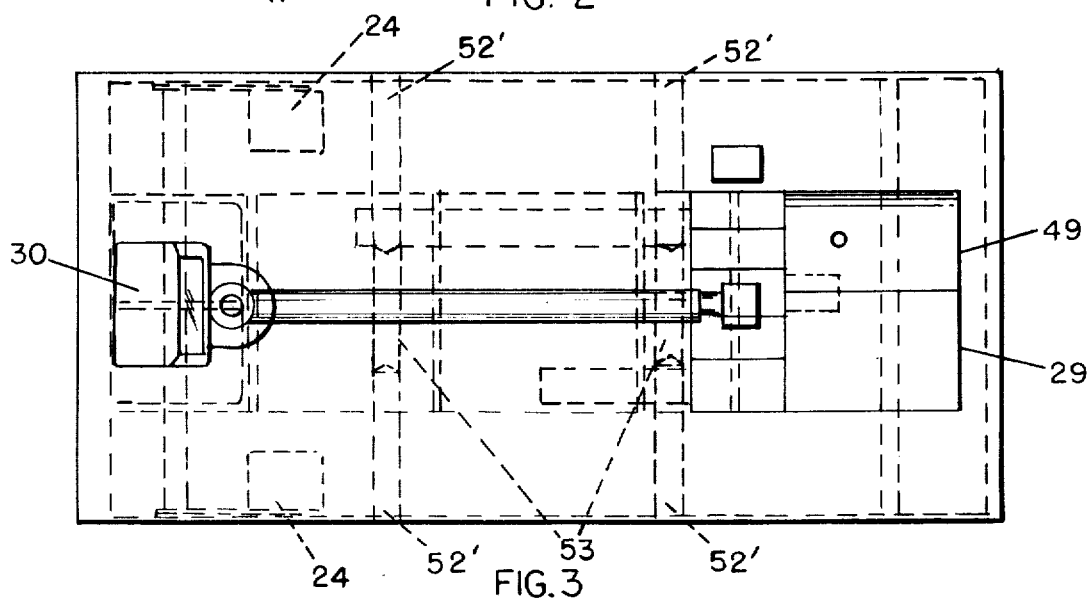
FIG. 3 is a top view of this invention.
Figure 4:
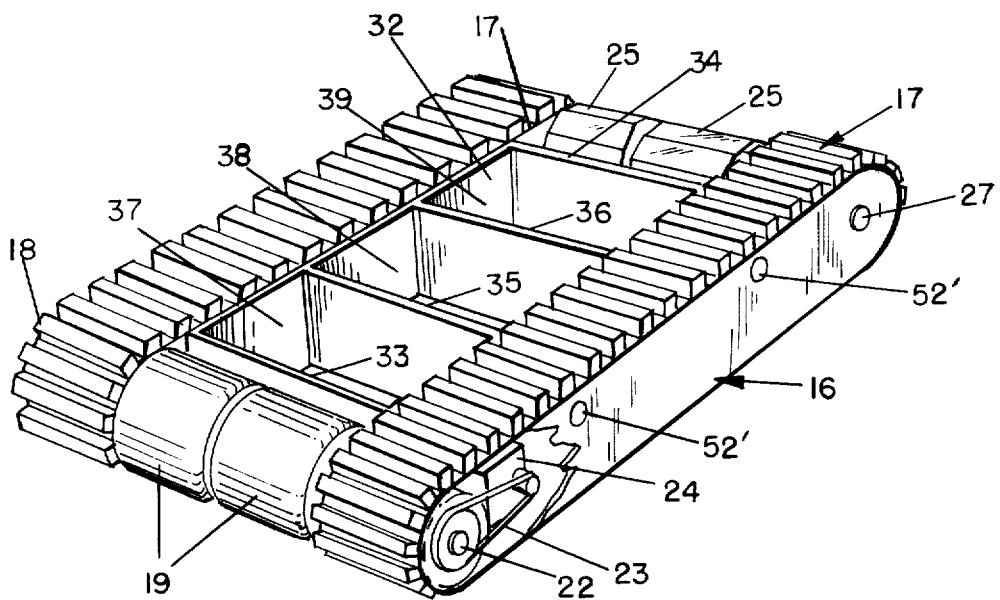
FIG. 4 is a rear pictorial view of this invention with the body structure removed at track level.
Figure 5:
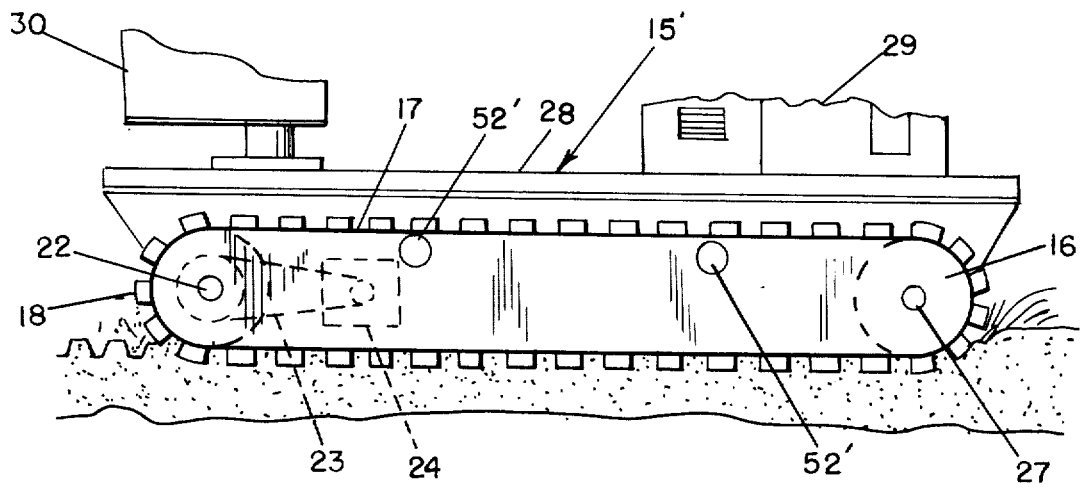
FIG. 5 is a more detailed side view of this invention, clearly showing the floatable cleats compressing and compacting the terrain on which the vehicle is moving.

Directing ones attention now to the accompanying drawings, and particularly to FIGS. 1, 2, 3, 14 and 15', it will be seen that the reference number 15' indicates this invention in its entirety.

DETAILED DESCRIPTION

The invention consists of two equally spaced and parallel floatable elongated bodies 16 each of which is encompassed by a belt 17, having a plurality of extended spaced, parallel and laterally spaced and laterally disposed floatable cleats 18.

More will be said about these cleats 18 later on in this specification. The invention also embodies two wide rear wheels 19 that are emcompassed in part by a box-like wheel structure 20 that contains a centrally located (laterally) axle support structure 21. While the wheel structure 20 is clearly shown in FIG. 9 of the appended drawings, the axle support structure 21 is shown only in FIG. 10. The axle bearing support structure 21 contains a double bearing in which the inner end of each wheel axle 22 is inserted when this portion of the invention is assembled. The aforesaid double bearing is not shown in any of the figures of the appended drawings for reasons of clarity. The outer end of each wheel axle 22 is provided with a drive sprocket over which is placed a drive chain 23 that encompasses in part the drive sprocket of the hydraulic motor 24.

Going back now for a moment and looking at FIG. 9 of the accompanying drawings it will be seen that the wide front wheels 25 are mounted in a structure similar to that of the wide rear wheels. In the case of the wide front wheels 25, the box-like supporting structure is indicated by the reference number 26 and the axle 27 of the wheels is rotated by a sprocket over which runs the aforesaid belt 17. Each of the aforesaid wide front wheels is actually polygon-like in shape, when viewed from the end, and each wheel is provided with a steel face.

The body structure 28 of this invention, as shown in FIG. 9 of the drawings, consists of the underside of the traction structure of this invention. The unit construction of the four fully assembled and self-contained traction bodies plus the airlift structure on the underside of the body structure 28 (as shown in FIG. 9 of the appended drawings) is a front side pictorial exploded view of this novel invention and illustrates the fully assembled traction bodies 16, 26, and 20 as well as 28 as relating to the airlift configuration on the underside of the body structure 28 having part of the deck that extends over to the outer longitudinal edge of the floatable elongated bodies 16 of the invention. The body structure 28 is provided with a cab 29 in which is housed operating personnel and the controls for this invention. Also, adjoining the said cab 29 is the following-mentioned blowers, hydraulic pump 48 and hydraulic motor 46 and engine 49 to activate the blowers and pumps. A crane 30, or any other desired object, is normally located on the deck of the aforesaid body structure 28. The underside of the body structure 28 is provided with laterally and downwardly extending semi-rigid air lift curtains 31 and 32 as well as end curtains 33 and 34 and the laterally-disposed intermediate curtains 35 and 36. All of this structure, which is shown in FIG. 9 of the accompanying drawings, forms the air lift chambers 37, 38, and 39 when this invention is assembled. The air lift chambers are clearly illustrated in FIG. 10 of the drawings. Each air lift chamber 37, 38, and 39 receives air pressure when neccessary from the ducts 40, 41, and 42 which are connected at the upper end to the blowers 43, 44, and 45 that are all mounted on a single laterally-disposed drive shaft whose outer end is connected by a hydraulic motor 46 and hydraulic pumps 48 to engine 49.

Before going any further in the detailed description of the construction of this invention it must be understood that the same curtains 31 to and including 36 that are shown and indicated in FIG. 9 of the drawings are also shown in FIG. 10 of the drawings.

Figures 6, 7:
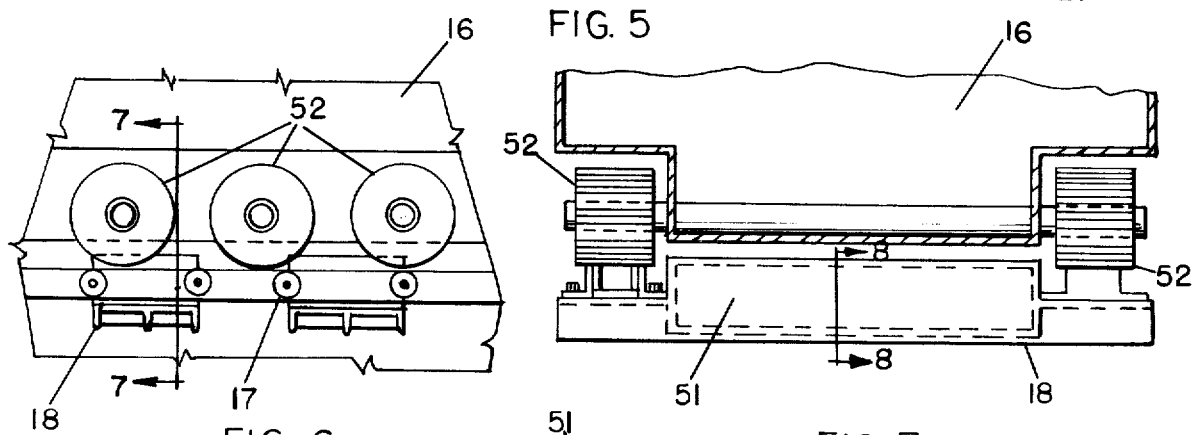
FIG. 6 is a portion of the outside of one of the floatable elongated bodies showing detail construction of a part of this invention.
FIG. 7 is a sectional view of this invention, taken substantially along line 7—7 of FIG. 6, and viewed in the direction indicated by the arrows.
Figure 8:
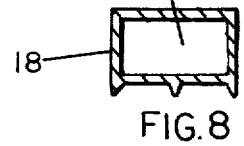
FIG. 8 is a sectional view of that detail of this invention known as a floatable cleat, taken substantially along line 8—8 of FIG. 7, and viewed in the direction indicated by the arrows.

Directing one's attention now to FIGS. 6, 7, and 8, one will see the detail construction of the floatable cleats mentioned in the Abstract of the Disclosure of this invention. In the above noted figures it will be seen that each floatable cleat 18 is provided with a hollow floatable portion 51. The cleats are also secured to and are part of the belt or track portion. A steel belt, which is also known and sometimes called a track by those experienced in the art, is indicated by the number 17 of this specification. The belt or track 17 rides on a plurality of track rollers 52 which are mounted in the manner shown in FIG. 7 of the drawings on the floatable elongated body 16.

The only other major novel and unique part of this invention that I have not so far described nor even mentioned is the coupling axles 52' which are best shown in FIG. 9 of the accompanying drawings. From examination of FIG. 9 it will be seen that the obvious purpose of these axles 52', as the name implies, is to couple or secure the floatable elongated bodies 16 to the body structure 28 by insertion into the tubular axle housings 53. The axles 52' are provided with a flat plate, nut, or any other desired device on the outer end thereof for ease in assembly and/or disassembly when the axles are slipped into the tubular housings 53, as will be clearly understood by examination of FIG. 9 of the appended drawings.

The way in which this invention of an amphibious air track vehicle is operated is so obvious to anyone who has ever operated any type of track vehicle or the like that no description of its operation is needed or is given in this specification.

I have now described the detail construction of this novel invention of my amphibious air track vehicle. The theory of the actual support and longitudinal motion of the aforesaid vehicle will be obvious to those experienced in the art upon examination of the first fourteen figures of the appended drawings. However, for the benefit of those not so experienced in the art, or versed in the theory of support and motion of this novel amphibious vehicle, I am herein explaining the same in as few words as possible with the help of FIGS. 14 and 15 of the appended drawings.

Figure 14:
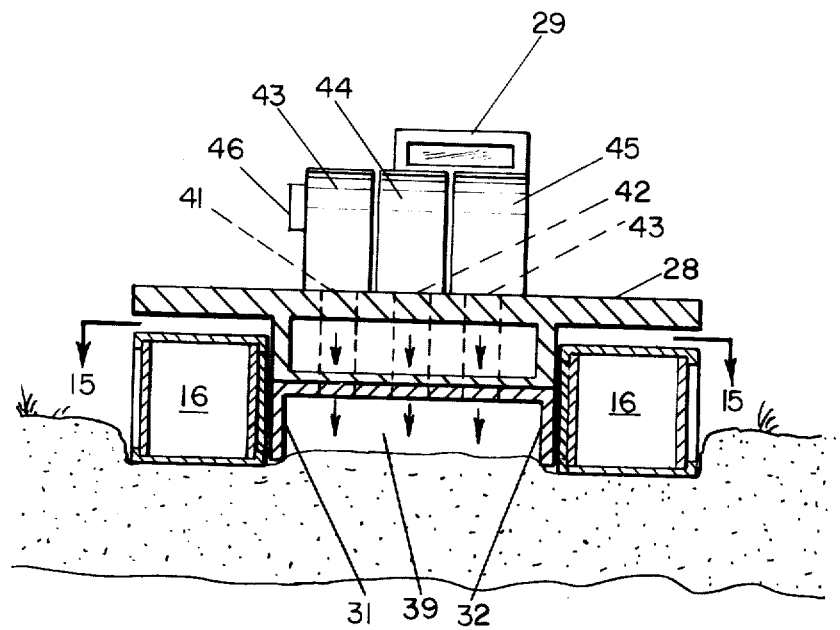
FIG. 14 is a sectional view of this invention, taken substantially along line 14—14 on FIG. 1, and viewed in the direction indicated by the arrows. This view does not include any details of construction since it is used only to illustrate the theory of this invention.
Figure 15:
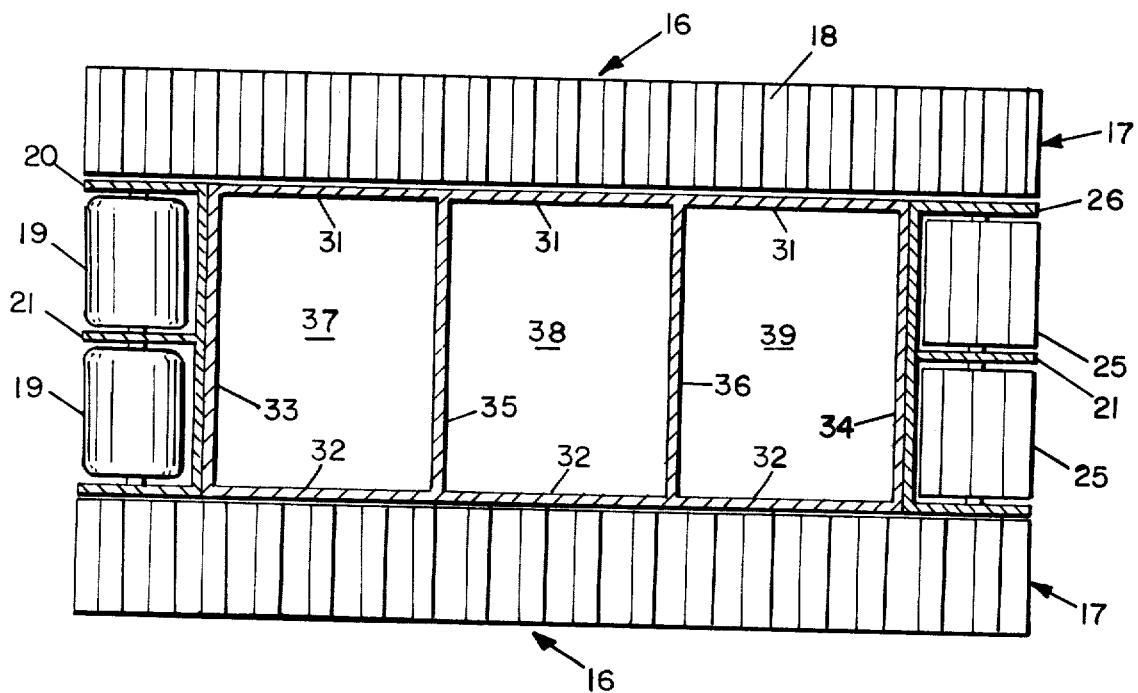
FIG. 15 is a sectional view of this invention, taken substantially along line 15—15 of FIG. 14, and viewed in the direction indicated by the arrows.

Directing ones attention to the just-mentioned FIG. 14 it will be seen that this figure is a lateral sectional view of the invention 15, taken substantially along the already mentioned line 14—14 on FIG. 1 of the appended drawings, which clearly shows a vehicle made according to this specification. Regardless of the detailed construction, the aforesaid vehicle must embody a horizontally-disposed body structure 28 having a flat upper deck. Underneath each side of the flat deck is one of the two floatable elongated traction bodies 16. In the underside center portion of this body vehicle is a plurality of compartments in which air pressure is blown from the air blowers. The compartments are the previously-described air lift chambers 35 of this invention.

Now when the air pressure from the aforesaid blowers builds up to say an air pressure of approximately two pounds per square inch in the three air lift chambers 37, 38 and 39, a part of the vehicles weight is lifted and forward motion, which is produced by both the two floatable elongated bodies 16 and the two wide wheel assemblies whose wheels are indicated by the reference numbers 19 and 25. It is the wheel assembly units, one forward and one aft, that along with the floatable elongated bodies 16, form the air lift area that is formed into the three compartments by means of the end curtains 31 and 32 and the internal vertically-disposed and laterally-extending semi-rigid curtains 33 and 34 that are illustrated in FIG. 10 of the appended drawings.

It must be realized at this time that the previously-mentioned two pounds per square inch air pressure is only a figure of speech, as actually any desired air pressure can be used. This vehicle does not and is not ever intended to "float" above the ground as is done with certain other types of vehicles embodying a downward blowing of air. The air pressure or flow in this instance only assists in lifting a portion of this vehicle's total weight off the two floatable elongated bodies 16. It must also be realized that the power to give longitudinal motion to the vehicle is available at all times to not only the two just and often mentioned floatable elongated bodies 16 but also to the four wheel assemblies supporting the wide wheels 19 and 25, the first two of which are located at the rear of the vehicle and the second two of which are located at the front of the vehicle. All four of the wide wheels 19 and 25 being located between the floatable elongated bodies 16. This location of the parts of this novel invention, so carefully described in this and the immediate proceeding paragraphs of this specification, and their function along with the downward flow of air pressure in the aforesaid air lift chambers is an auxiliary of this invention.

It must also be realized at this time that while I have spoken of the four wide wheels 19 and 25, the wheels are of course supported by and held in place by the two (one at each end) box-like structures 20 and 26. The box-like structure 20 is located at the rear end of the vehicle and the box-like structure 26 is located at the front end of the vehicle. It is these two box-like wheel structures along with the two elongated floatable longitudinal traction bodies of the underside of the flat upper deck body structure 28 that form rigid outer walls of the air lift chambers of this invention.

Figure 11:
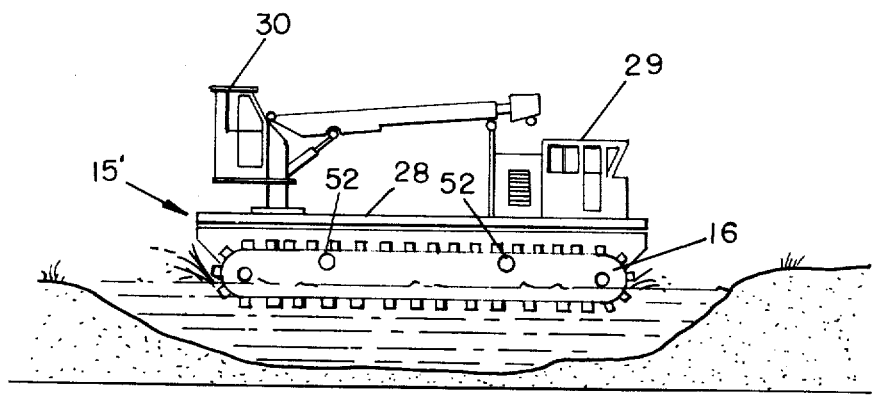
FIG. 11 is a side view of this invention floating in deep water or the like and showing the air lift pressures not applied.
Figure 12:
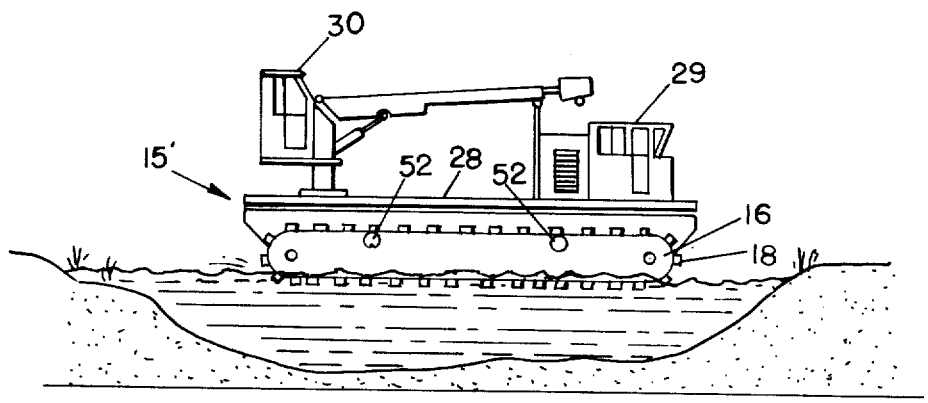
FIG. 12 is a side view of this invention in deep water or the like showing the air lift pressures applied.

When this track vehicle goes into deep water, as is illustrated in FIG. 11 of the appended drawings, the downward flow of air under pressure builds up. Airlift, as designed, turns on. The full floating position of the vehicle in this condition is shown in FIG. 12 of the drawings.

Figure 13:
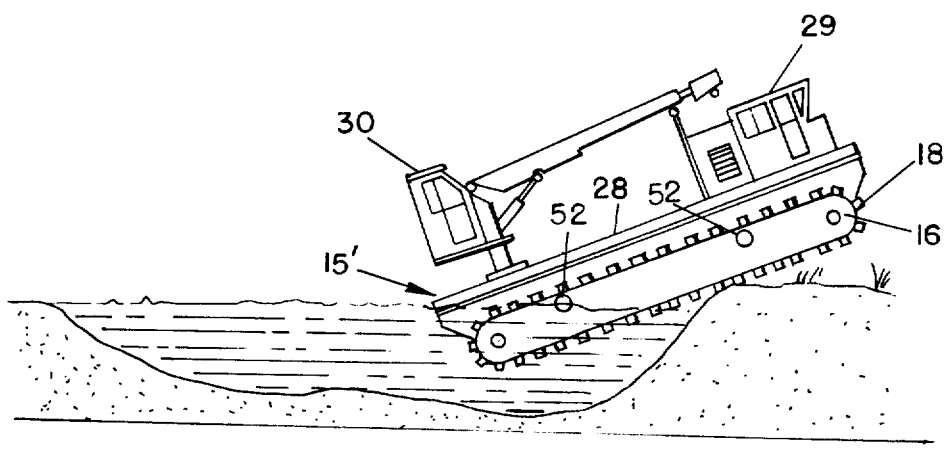
FIG. 13 is a side view of this invention climbing out of deep water.

When the vehicle is climbing out of the water (FIG. 13) or on rough terrain, airlift is designed to turn off. The air pressure again turns on when the vehicle is on marsh lands or over any kind of boggy terrain, as can be seen in FIG. 14 of the often-mentioned drawings. The soft terrain accepts the airlift pressure to the underside of the often-mentioned vehicle as herein described. Traction for longitudinal motion is obtained by means of the wide wheels 19 and 25 and the endless tracks on the elongated floatable bodies 16. FIG. 12 of the accompanying drawings illustrates this invention traveling over water or soft terrain with the air lift pressure turned on in which case a portion of the weight on the vehicle and its pay load are removed from both the wide wheels 19 and 25 and the elongated floatable bodies 16, thus increasing ground pressure tractions area operational cargo carrying capacity of this invention.

This invention is subject to any and all changes in detail design, construction and/or modifications that one may care to make in so long as the changes and/or modifications all fall within the scope and intent of the appended claims.

It must be understood that while I have illustrated my invention in considerable detail, and described the construction of the same in like detail, I have obviously not illustrated nor described each and every detail of construction as these details are well known to those experienced in the mechanical arts.

What I now claim as new and desire to secure by grant of Letters Patent is:

1. An amphibious air track vehicle of the character described, comprising a plurality of floatable bodies, two of the said floatable bodies being rectangular in shape and having ends that are rounded when viewed from the side, the two said floatable bodies being in equal and parallel spaced relation to each other and one of the said floatable bodies being located on each side of the said vehicle, the said floatable bodies being adapted to both support the said vehicle in water and on land as well as to have variable speed controlled hydraulic motors in order to provide forward motion as well as directional control of the said vehicle, and one of the said motors being located in each floatable body which is provided with an endless steel belt around the periphery thereof and having floatable cleats thereon, and structure adapted to carry not only the components of the said vehicle but also operating personnel and payload, the said structure being a rectangular deck structure that rests just above said floatable cleats of the said floatable bodies, and the said rectangular deck having a cab mounted on the front portion thereof in which personnel and an operator of the said vehicle is located along with the controls of the said vehicle and a crane, and the said floatable cleats being secured to the said endless steel belt in spaced parallel and laterally disposed relation to each other around the said steel belt in order to compress the terrain on which the said vehicle is traveling as well as to compact the said terrain and the vehicle is also provided with two wide rear wheels having low pressure pneumatic tires mounted thereon, the said wheels being end to end in a box-like structure and having their axles each rotated by one of said hydraulic motors at variable speed and the said hydraulic motors being the same source of power that rotates the said endless steel belts around the floatable bodies; the said vehicle is also provided with two wide front wheels each having a steel face, each front wheel having an end configuration of a polygon and both front wheels being mounted end to end in a box-like structure and the axle of each front wheel projecting outwardly and connected to a front sprockets axle of one of the rectangular floatable bodies, and the said rectangular deck structure is also provided with a plurality of equally spaced, parallel and laterally disposed and downwardly extending air ducts, air lift chambers, and curtains of semiflexible material that divides the space between the front and rear box-like structures that support the said wheels and also between the inside vertical side surface of each of the said floatable elongated bodies into a plurality of air lift chambers, the floatable bodies and two box-like structures providing four outer support rigid walls for the said air lift chambers.

2. The invention of claim 1 wherein the said invention is provided with an air blower for each air lift chamber, and each blower being connected to one of the air lift chambers by means of an air duct and all of the air blowers being mounted on top of the said structure that is located between each said floatable body, and the blowers being connected together by means of a single shaft to one end of which is secured a hydraulic motor that receives its hydraulic fluid under pressure from hydraulic lines that are connected to a hydraulic pump which is activated by a power means.

3. The invention of claim 2 wherein the means of activating the said hydraulic pump is by an internal combustion engine.

4. The invention of claim 1 wherein the two floatable bodies are secured to the rectangular deck structure by a plurality of equally spaced and horizontally disposed and laterally extending tubular housing removable type coupling axles.

5. An amphibious rectangular air track vehicle of the character described, that is provided with, and powered with, four ground contact buoyant bodies that are traction bodies, two of the said bodies being longitudinally extending in spaced parallel and laterally disposed relation to each other and provided with floatable tracks; the other two of the said bodies being floatable box-like wheel structures that are positioned in between the two longitudinally disposed traction bodies; the box-like wheel structures being located one at each end of the vehicle.

6. The invention of claim 5 which includes an air lift traction structure which turns on air lift chambers that supply compressed air pressure to the surface of ground or watery terrain, thus providing air lift and friction-free traction area for said vehicle and relieving the ground contact traction bodies thereof.

* * * * *